FIG. 1

INVENTOR:
Joseph T. McNaney

June 23, 1959

J. T. McNANEY 2,892,186

ANALOGUE DATA CONVERTER

Filed March 5, 1953

INVENTOR:
Joseph T. McNaney
BY
ATTORNEY

INVENTOR:
Joseph T. McNaney
BY
ATTORNEY

United States Patent Office 2,892,186
Patented June 23, 1959

2,892,186

ANALOGUE DATA CONVERTER

Joseph T. McNaney, San Diego, Calif., assignor, by mesne assignments, to General Dynamics Corporation, a corporation of Delaware Application March 5, 1953, Serial No. 340,596

5 Claims. (Cl. 340—324)

This invention relates to analogue conversion systems and has particular reference to systems which rapidly display on a cathode ray tube the digital magnitude of the analogue quantity.

Devices of this nature find considerable application in many fields of modern technology, such as vibration analyses, servomechanism investigations, the reduction of telemetric data, and as a digital voltmeter.

It is a principal object of the present invention to provide a system whereby a plurality of potentials may be monitored and a digital measurement thereof may be displayed on the screen of a cathode ray tube.

It is another object of the present invention to provide a system whereby digital accuracies of unidirectional potentials are displayed on a cathode ray tube.

It is another object of the invention to provide means whereby analogue data is converted and displayed in numerical form in a suitable manner for recording with conventional oscilloscopic photographic methods.

It is still another object to provide a system for displaying one or more positive or negative unidirectional potentials in accurate numerical form on the screen of a cathode ray tube.

It is a further object of the present invention to provide a simplified and accurate means for transforming analogue potentials into accurate digital voltages.

Other objects and features of this invention will be readily apparent to those skilled in the art from the following specification and appended claims illustrating certain preferred embodiments of this invention in which:

Figure 4 shows the numerical representation on the screen of the charactron tube of a pair of analogue quantities applied to channels A and B.

In my copending application, Serial No. 298,603, filed July 12, 1952, now Patent No. 2,735,956, issued February 21, 1956, and assigned to the same assignee as the present application, there is disclosed a cathode ray type device with an electronic gun, selection means, character shaping means, deflection means, and a fluorescent screen all of which are enclosed in an evacuated envelope. The circularly cross-sectioned electron beam, which is generated by the electron gun, travels from the gun to the fluorescent screen, passing through the selection means, which are employed to direct the beam to a predetermined position on the character shaping means. Transverse movement of the beam may be effected by an electrostatic field established by the application of potentials impressed upon the selection means which comprise a pair of horizontal conducting plates and a pair of vertical conducting plates positioned on each side of the beam.

Electrostatic fields between the horizontal plates provide movement of the beam in the left-right plane, whereas the field within the vertical plates provides movement in the up-down plane. Since the angle at which the beam emerges from the selection system is proportional to the potential difference existing between each pair of conducting plates, the electron beam may be directed to any position upon the transversely-positioned character shaping means by the application of potentials upon the selection plates. The aforementioned character shaping means may include a matrix with individually-shaped openings therein in the from of letters, numerals, and related symbols, however, the character shaping means utilized in the present invention preferably includes only the numerals 0 through 9 and the symbols + and —. The electron beam upon passing through any given opening in the matrix will assume the characteristic shape of that opening. These numeral shaped openings may be arranged within the matrix in any desired manner and for purposes of illustration, the configuration herein selected is a single horizontal row of numerals with the plus sign immediately above the zero shaped opening and the minus sign immediately below the zero opening. After the shaping operation of the electron beam by the matrix, the beam passes through the deflection system and is projected upon the fluorescent screen which gives off light where bombarded by the shaped electron beam. The deflection system comprises a pair of horizontal and vertical conducting plates which are operationally similar to those of the selection system and serve to properly space and position the shaped electron beam upon the screen.

Selective potentials developed by the system are utilized in association with the selection means to establish the required electrostatic field for positioning the electron beam upon the numeral shaping matrix. Units of the present invention transform the instantaneous value of the applied analogue quantity into these selection potentials, which when applied to the horizontal selection plates, direct the electron beams to the appropriate opening in the matrix. Where accuracies of one part in 1000 are desired, three selection potentials, representing 100's, 10's, and units, are developed by the system and applied sequentially to the selection plates. Hence, the electron beam first passes through the proper opening dictated by the 100's digit, secondly the beam passes through the proper opening in accordance with the value of the 10's digit, and after the two previous numerals are formed the beam is directed to the opening in the matrix which represents the unit magnitude. Actually, the order in which the 100's, 10's, and units digits are sequentially formed is immaterial.

Three potentials corresponding to the three selection potentials are applied, respectively, to the deflection plates, which serve to position the 100's, 10's, and units digit in their proper order on the screen of the charactron tube. These deflection potentials also serve to position the entire three place number on the fluorescent screen with respect to other numbers representing analogue quantities of other channels of the system.

In the disclosed embodiment a dual channel system of the present invention is shown and described. One analogue potential is applied to the input of each channel and from the time sharing characteristics of the system, the time during which one analogue potential is being converted to a plus or minus three place number, the digital information of another analogue potential is being transferred without a loss in accuracy to the display device. This time sharing aspect permits the maximum amount of time for each conversion process from analogue to digital form. With the conversion time of each voltage sample being in the order of a few milliseconds, it becomes apparent that the number of samples per second of each of several analogue quantities applied to separate channels may become quite large. Where a large number of independent analogue quantities are applied to separate channels, conventional electronic commutation techniques may be advantageously applied to maximize the sampling rate and consequently the number of independent quantities which may be investigated.

Figure 1:
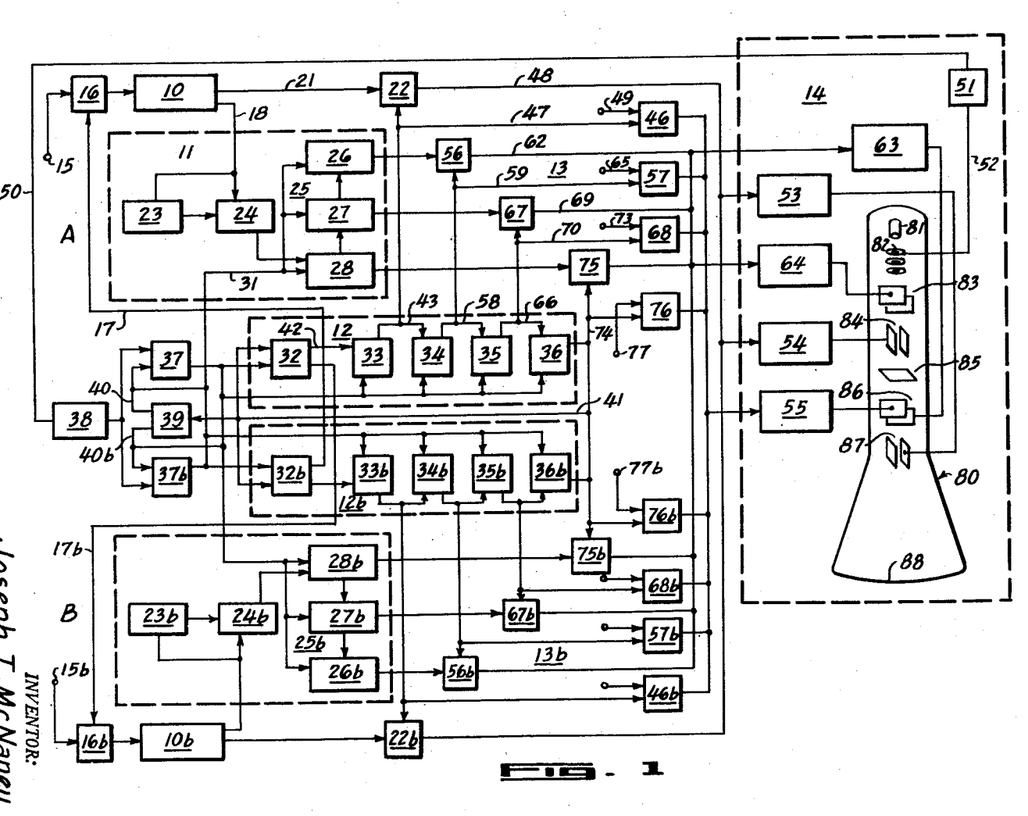
Figure 1 illustrates an embodiment of the analogue converter system of the present invention for converting and displaying a pair of analogue quantities into numerical form.

Referring now to Fig. 1 which illustrates the present invention, a two channel system is shown with one channel denoted A and the other channel denoted B. Although but two channels have been illustrated, the principle of the present invention is not limited thereto and it will be readily apparent to those skilled in the art that additional channels may be readily added to extend the number of separate analogue quantities which may be applied to the system with the accurate numerical value thereof appearing on the display device. Each channel is physically and functionally similar and consequently, only channel A will be described. Corresponding units of channel B will be assigned corresponding reference numerals as the units of channel A with a suffix B associated therewith.

Figure 2:
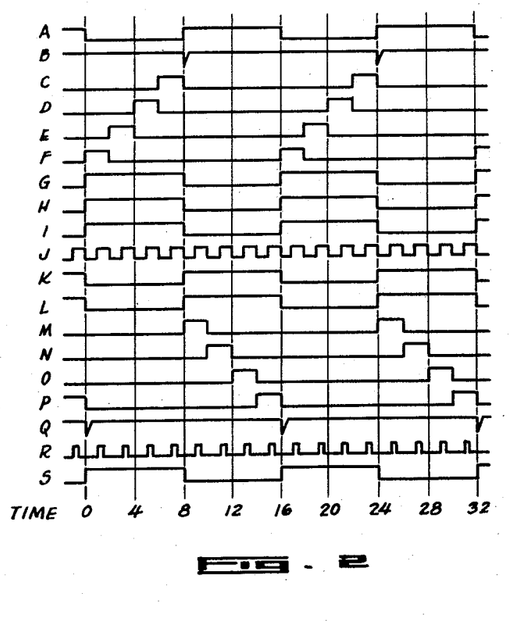
Figure 2 shows a timing diagram of the sequence of operation of the units of the present invention and their relative time relationships.

Each channel, such as channel A, includes a polarity sensing unit 10, a conversion unit 11, which is enclosed in a dotted rectangle, a linear counter 12 also enclosed in a dotted rectangle, and gating circuits denoted generally by the reference numeral 13. A digital display unit 14, enclosed in the rectangle, is provided and is common to all channels. One analogue input voltage is applied to the input terminal 15 of channel A which is interconnected to a gating circuit 16. The gating circuit 16 may be a conventional switching circuit which is capable of opening or closing the path from the input terminal 15 to the conversion unit 11. Such gating circuits as circuit 16, as well as other gating circuits to be hereinafter mentioned, are widely published in texts and handbooks, for example, by William Keister, A. E. Ritchie, and S. H. Washburn in "The Design of Switching Circuits," Van Nostrand Company, Inc., September 1951, pages 214–226. The gating voltage which serves to open or close the circuit 16 is developed by the linear counter 12b associated with channel B and is applied from said counter 12b by a lead 17. As mentioned hereinbefore, during the period which the three voltage levels representing the decimal number of the potential applied to another channel, in this example channel B, are coupled to the digital display unit 14, the analogue potential applied to another channel, here channel A, is being converted to a plus or a minus three place number by the conversion unit 11. Since the potentials are continuously applied to the input terminals of each channel, during the display period of a particular channel the input signal applied thereto is blocked from its conversion unit, whereas, all other channels are performing conversion operations. Now, assume that a time sharing operation has just been concluded and a new cycle is initiated whereby the display of information in channel B is commenced and the conversion process in channel A is simultaneously initiated. This is the time $T=0$, as illustrated in Fig. 2, and it may be noted by Figs. 2–S and 2–A, which show the voltages applied to the gates 16 and 16b, respectively, that a positive impulse is applied to the gate 16, whereas, a negative impulse is applied to the gate 16b. These impulses are effective to open the gate 16 and close the gate 16b. Therefore, the potential appearing at input terminal 15 is applied to the polarity sensing unit 10.

Figure 5:
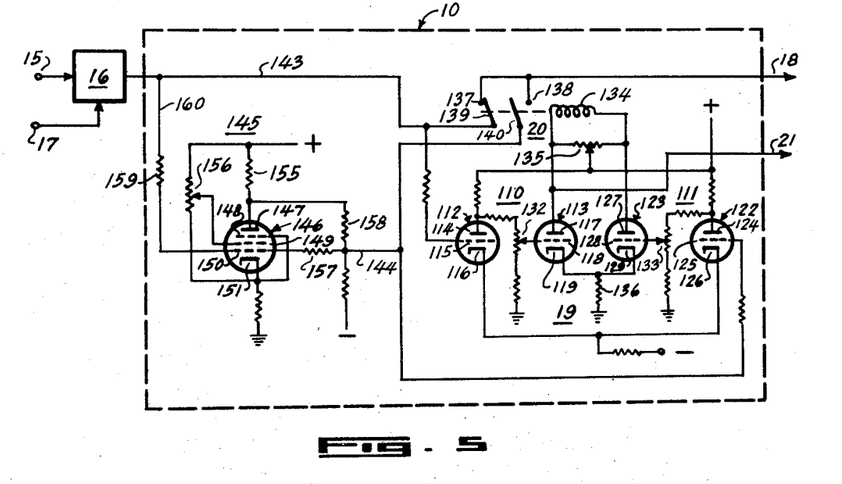
Figure 5 is a schematic diagram of the polarity sensing unit 10.

In the present invention analogue potentials applied to the particular input terminals may be either positive or negative or may pass through zero voltage during their normal excursions, consequently, the polarity sensing unit 10 is provided to allow either positive or negative potentials to be applied to each channel, for example, −50 volts to +50 volts, without complicating the system to afford voltage variations of 100 volts rather than 50 volts with the appropriate polarity sign associated therewith. The polarity unit 10 serves to maintain a uni-polarity signal applied to the conversion unit 11 and, as shown in Figure 5, includes a polarity amplifier 19 which actuates a DPDT, two position, polarized relay 20 in the presence of a negative voltage. The polarity amplifier is a conventional and well-known circuit and for its use herein, it includes two resistance coupled dual-triode stages with each tube forming a balanced difference amplifier with the relay connected between the plates of the last two units. The relay, having a magnetically polarized yoke, is sensitive to the polarity of the applied coil voltage, therefore, when the applied coil current flows in one direction a pair of normally open contacts are caused to close, whereas, current flow in the reverse direction merely adds to the biasing force on the armature and no change in status occurs. The application to the sensing unit 10 of a positive voltage does not change the state of the relay and the analogue voltage is applied to the conversion unit 11 by a lead 18 with its polarity unreversed. Hence, regardless of the polarity of the incoming voltage the polarity of the voltage applied to the conversion unit 11 is always positive. Although the potential appearing on the lead 18 is independent of the polarity of the incoming signal, a pair of voltages to be described hereinafter are developed within the sensing unit 10 which are applied by a lead 21 to a gating circuit 22 which are a function of the input polarity.

Schematically illustrated in Figure 5 is an embodiment of the polarity sensing unit 10 which serves to extend the useful range of the present invention by providing a unipolarity signal over lead 18 to the conversion unit 11 irrespective of the polarity of the signal delivered from gate 16. As mentioned hereinbefore, sensing unit 10 may include a polarity amplifier 19 which comprises two resistance coupled dual-triode stages 110 and 111. Stage 110 includes electron tubes 112 and 113 with tube 112 having at least an anode 114, a control grid 115, and a cathode 116 and tube 113 having an anode 117, a control grid 118, and a cathode 119. Stage 111 is similar to stage 110 and includes electron tubes 122 and 123 with tube 122 comprising at least an anode 124, a control grid 125, and a cathode 126 and tube 123 comprising at least an anode 127, a control grid 128, and a cathode 129. Tubes 112 and 113 are interconnected by resistance coupling between anode 114 of tube 112 through a balancing potentiometer 132 to control grid 118 of tube 113 and in a similar manner tubes 122 and 123 are interconnected by resistance coupling, in this stage, between anode 124 of tube 122 through a balancing potentiometer 133, similar to potentiometer 132, to control grid 128 of tube 123.

As stated hereinbefore stages 110 and 111 together form a balanced difference amplifier with winding 134 of relay 20 connected between anodes 117 and 127 of tubes 113 and 123, respectively. Also connected between anodes 117 and 127 are the fixed terminals of a potentiometer 135 which is also connected across winding 134 of relay 20 and together therewith provides the common load impedance between the two stages, 110 and 111. Anode voltage is supplied the tubes 112, 113, 122, and 123 from a source of positive voltage not shown. Cathodes 119 and 129 associated with tubes 113 and 123, respectively, are interconnected and connected to ground through a resistor 136 and cathodes 116 and 126 associated with tubes 112 and 122, respectively, are both connected to a source of negative voltage not shown.

As further illustrated in Figure 5 the DPDT, polarized relay 20 comprises a pair of stationary contacts 137 and 138 and a pair of associated movable contact arms 139 and 140. Relay 20 has a magnetically polarized yoke and is responsive to the polarity of the potential applied across coil 134. Due to the action of the polarizing yoke, in the normal, positive, condition of the relay contacts, which is the condition shown in Figure 5, movable contact 139 is made to engage stationary contact 137 and contacts 140 and 138 are open. Hence, output lead 18 is interconnected through contacts 139 and 137 to lead 143, which carries the input signal delivered from gate 16. In the negative condition, that is when current is caused to flow through coil 134 in an opposite direction to that established in the normal state, contact arm 140 is driven to engagement with the normally open contact 138 and the connection between contact arm 139 and stationary contact 137 is broken. In this condition, output lead 18 is disconnected from lead 143 and connected through contacts 140 and 138 to lead 144, which serves to couple the signal developed by inversion circuit 145 to the polarity amplifier 19. Leads 143 and 144, in addition to being connected to contact arms 139 and 140, are also interconnected with control grids 115 and 125, respectively, and thereby serve as the two input terminals over which the input signals are applied to stage 110 and stage 111.

Sensing unit 10 also includes the inversion circuit 145, which may be a plate-to-grid negative feed back circuit having unity gain and which serves to develop the input signal applied to stage 111 of the polarity amplifier 19. Inversion circuit 145 includes an electron tube 146 having an anode 147, suppressor grid 148, screen grid 149, control grid 150, and cathode 151. As shown in Radiation Laboratory Series, volume 19, page 29, desired operation of the circuit is realized by connecting a source of positive voltage (not shown) to anode 147 through load resistor 155, to screen grid 149 through the variable tap of potentiometer 156, and to cathode 151 also through the potentiometer 156. Control grid 150 is connected to a source of negative voltage (not shown) through a resistor 157, and is also connected to anode 147 through resistor 158 as well as resistor 157. The input signal is applied to the control grid 150 from the lead 143 through resistor 159 by a lead 160. The output signal produced by the inversion circuit 145 appears at the junction of resistors 157 and 158 and is applied by the lead 144 to the movable contact 140 of relay 20 and is also applied to the control grid 125 of tube 122.

The magnitude and direction of current flow through relay coil 134 of the polarity amplifier 19, which are determined by the magnitude and polarity of the potential drop across resistor 135, control the operation and function of polarity unit 110. When equal electron currents flow in tubes 113 and 123 of amplifier 19, equal potentials are developed across the respective sections of load resistor 135 and equal potentials will appear at anodes 117 and 127 of tubes 113 and 123, respectively. Thus, when amplifier 19 is balanced, which is the condition when equal currents are flowing in tubes 113 and 123, the potential difference appearing across coil 134 is zero and no current flows therein. In this condition, relay 20 is retained in its normal condition, as shown in Figure 5, and contacts 137 and 139 are closed by the permanent magnetic field of the relay yoke. On the other hand, when amplifier 19 is unbalanced such that unequal currents flow through tubes 113 and 123, the potentials developed across the respective sections of load resistor 135 are unequal and a potential difference exists between anodes 117 and 127, respectively. This potential difference also appears across coil 134 and causes a current to flow therein, whereby an electromagnetic field is produced. The direction of the current flow through coil 134 establishes the polarity of this magnetic field which may either reinforce or oppose the permanent field of the relay yoke. To more clearly understand the operation of amplifier 19, assume that when anode 117 is positive with respect to anode 127 current flow through coil 134 is in a direction which produces a field that reinforces the permanent field of the relay yoke. This unbalanced condition of amplifier 19 is established when current flow in tube 123 is greater than the current in tube 113. This is the condition established by raising the potential of grid 128 of tube 123 and lowering the potential of grid 118 of tube 113. Since grid 128 of tube 123 is coupled to anode 124 of tube 122, it follows that in order to raise the potential of grid 128 the current of tube 122 must be reduced, thereby reducing the potential drop across the load resistance associated with anode 124, which causes the potential of anode 124 to rise toward the positive supply voltage. The voltage increase appearing at anode 124 is coupled to grid 128 which, in turn, causes anode 127 to be driven to a lower potential thereby establishing the conditions assumed above for stage 111. Under the conditions assumed above, current flow in tube 113 of amplifier stage 110 is less than that of tube 123 and is established by reducing the potential of grid 118 of tube 113. Obviously, an increase in current through tube 112 will produce an increased potential drop across the load resistance associated with anode 114 which, in turn, will cause the potential of plate 114 to be correspondingly reduced. Grid 118 of tube 113 is resistively coupled to anode 114 of tube 112 and, therefore, the potential on grid 118 will also be reduced. To establish the assumed current through tube 112, the potential of grid 115, to which input signals from gate 16 are coupled by lead 143, must be raised. Thus, it becomes apparent that when input signals applied to sensing unit 10 are positive, the proper conditions are established in stage 110 of amplifier 19 for maintaining relay 20 in its normal condition. To establish the proper characteristics in stage 111 and to satisfy the assumed conditions, the required increase in current through tube 123 is established by reducing the potential applied to grid 125 of tube 122. As described hereinbefore, grid 125 is coupled to the output of inversion circuit 145 by lead 144. Inversion circuit 145 serves to produce output potentials of equal but opposite polarity with respect to the input potentials applied thereto. Thus, in the assumed condition wherein a positive potential is applied to grid 115 over lead 143 from gating circuit 16 a positive input signal from gate 16 is also applied to inversion circuit 145 along lead 160. Accordingly, an output of equal potential but of negative polarity is developed by circuit 145 and applied along lead 144 to grid 125 of tube 122. Thus, in this manner the proper conditions are established in stage 111 of amplifier 19 to maintain relay 20 in its normal condition. The operational theory of inversion circuit 145 is well known and is fully explained in the Radiation Laboratory Series, volume 19, page 27. Briefly, however, a positive input signal applied to grid 150 of tube 146 is amplified, inverted, and applied to common junction of resistors 157, 158, and output lead 144. The feedback action in the circuit is essentially instantaneous and the potential of grid 150 remains virtually unchanged. The potential drop across resistors 159 and 157 provide a dividing circuit such that the potential of lead 144 is equal but of opposite polarity with respect to the input potential on lead 160. Variable resistor 156 serves to provide a variable voltage to screen grid 149 in order to assure that circuit 145 has a gain of minus one.

As stated hereinbefore, when relay 20 is in its normal condition, as shown in Figure 5, output lead 18 is interconnected through relay terminals 139 and 137 with lead 143, over which the input signal from gate 16 is applied. Since the normal condition of relay 20 is established when the input signal is of positive polarity, the output signal carried by lead 18 is also positive. However, when the input signal from gate 16 is of negative polarity, the assumed conductive conditions of tubes 113 and 123 will be reversed. Accordingly, the relative potentials established at anodes 117 and 127 will also be reversed and the direction of current flow through relay coil 134 will likewise be reversed. The field produced by this current will be of opposite polarity with respect to the permanent field of the relay yoke. When this condition is established, the opposing field produced by coil 134 overcomes the permanent field of the relay yoke and the relay is actuated to its other state. In this state, terminals 139 and 137 are open and terminals 140 and 138 are closed. With the relay contacts reversed, output lead 18 is thus interconnected through contacts 138 and 140, with the inversion circuit 145 through lead 144. With the negative input signal from gate 16 being applied to inversion circuit 145 along lead 160, the output potential produced on lead 144 will be a positive signal of equal amplitude. Thus, the output of sensing unit 10, which is carried along lead 18, remains positive regardless of the polarity of the input from gate 16.

The output lead 21 also emanates from the polarity sensing unit 10 wherein it is connected to anode 117 of tube 113 associated with amplifier stage 110. The output signal carried on lead 21 will always be of the same polarity as the input signal applied to the polarity sensing unit from the gating circuit 16 since the input signal is twice inverted in passing through tubes 112 and 113.

Conversion means for transforming the analogue potential into digital form stored temporarily in 100's, 10's, and units are provided in the form of a conversion unit 11, which includes a time base circuit 23, a frequency generator 24, and a counting unit 25, comprising a 100's counter 26, a 10's counter 27, and a units counter 28. The frequency generator 24 serves to develop a voltage whose pulse repetition rate is directly proportional to the amplitude of the input analogue potential. These pulses are counted by the counting unit 25 during a precise time interval developed and controlled by the time base circuit 23 such that count accumulated in the counting unit 25 accurately represents the amplitude of the analogue potential. The frequency generator 24 is a bistable multivibrator whose repetition rate is varied by varying the potential applied to the grid return resistor of one side of the circuit. The pulsed output voltage developed by the circuit appears at the anode, the repetition rate of which is directly proportional to the voltage applied to the grid thereof from the sensing unit 10. By counting the output cycles over an accurately known and controlled interval of time, a decimal number will be obtained whose value is directly proportional to the analogue input level. Assume that the frequency generator provides a frequency shift 0 to 200 kc. in response to an input voltage variation from 0 to 50 volts and the on time for the generator is 5 milliseconds. Then, if during this time interval the input voltage is 50 volts, 1000 pulses will be produced by the generator and counted. Similarly, if the voltage applied to the frequency generator is 25 volts during the same time interval, 500 pulses will be counted. Obviously, the sampling rate of each channel, the number of channels being utilized, and the accuracy desired determine both the lower and the upper limits of pulse repetition rate of the frequency generator 24. It has been found that with six channels being utilized, with each analogue voltage being allowed to vary from −50 volts to +50 volts, with 20 samples per second for each channel, and with accuracies of one part in 1000, pulse repetition rates varying from 240 kc. to 360 kc. responsive to voltages from 0 to 50 volts are satisfactory when the time base unit 23 is set for controlling the on time of the generator 24 to 8⅓ milliseconds.

Figure 6:
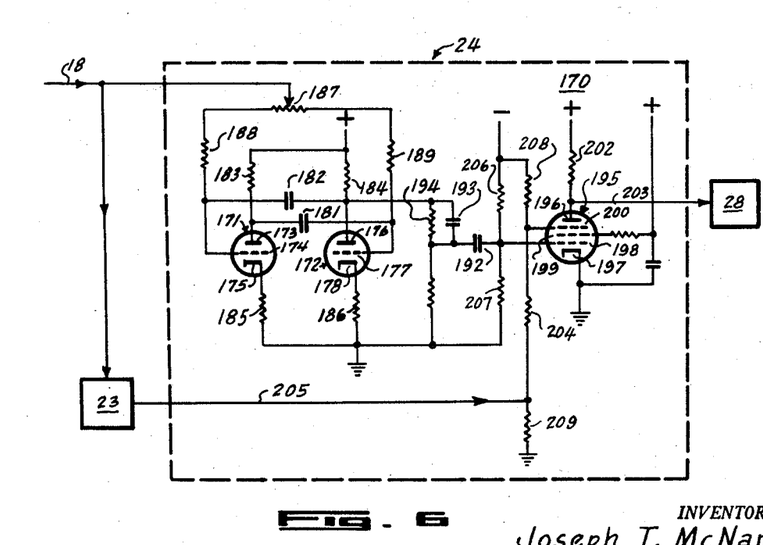
Figure 6 is a schematic diagram of the frequency generator 24.

Frequency generator 24, its associated gating circuit 170, and allied circuitry are schematically illustrated in detail in Figure 6. As stated hereinbefore, generator 24 serves to generate a pulsed output voltage having a repetition rate which is preferably linearly proportional to the amplitude of the input signal. Functionally, generator 24 and its associated circuits actually perform digital conversion of the varying analogue input signal applied thereto over lead 18. Generator 24 takes the form of a plate to grid coupled, free running multivibrator which comprises a pair of electron tubes 171 and 172. Tube 171 may be a triode having an anode 173, a control electrode 174, and a cathode 175 and tube 172 may similarly be a triode having an anode 176, a control electrode 177, and a cathode 178. Anode 173 is cross-connected to control electrode 177 through a capacitor 181, and anode 176 is cross-connected to control electrode 174 through a capacitor 182. Anode voltage is supplied the tubes 171 and 172 by connecting anodes 173 and 176 to a source of voltage (not shown) through plate resistors 183 and 184, respectively. The plate circuits of tubes 171 and 172 are completed by connecting cathodes 175 and 178 to ground through resistors 185 and 186. The input signal applied to generator 24 is the analogue signal delivered over lead 18 from the polarity sensing unit 10, described hereinbefore, and is applied simultaneously through a potentiometer 187 to control grids 174 and 177 through grid return resistors 188 and 189. The output signal developed by the multivibrator, which appears at the anode 176 of tube 172, is in the form of a chain of pulses having a frequency which is proportional to the magnitude of the applied analogue input signal. This output signal is applied to the gating circuit 170 through capacitor 192 and the network including capacitor 193 and resistor 194.

As shown, gating circuit 170 may be a conventional gating circuit having two input terminals and a single output terminal, and including an electron tube 195 having an anode 196, a cathode 197, a first control grid 198, a screen grid 199, and a second control grid 200. A source of voltage (not shown) is connected to anode 196 through load resistor 202 and the plate circuit of tube 195 is completed by connecting cathode 197 to ground. An output lead 203 is connected to anode 196 and across load resistor 202. The circuit arrangement of gate 170 is such that a signal is produced on output terminal 203 when, and only when, positive signals are simultaneously applied to the first control grid 198 and second control grid 200. Control grid 198 receives actuating pulses from the signal developed by generator 24, and the other required input signal is produced by the time base circuit 23 and is applied to control grid 200 through dropping resistor 204 by lead 205. Thus, when a positive pulse is impressed on grid 200 from time base 23, the positive pulses produced by generator 24 and impressed on grid 198 will be transferred to the output terminal 203 whereupon they are delivered to the digital counter unit 28, which will be described hereinafter. A voltage divider network is associated with gate 170 and serves to provide the necessary voltages to block gate 170 in the absence of an activating pulse from the time base circuit 23, as well as providing the proper bias voltage to control grid 198. The network includes in one branch series resistors 206 and 207, which are connected between a source of negative voltage (not shown) and ground, and in the other branch resistors 208, 209, and the dropping resistor 204 which are also connected across the source of negative voltage. Therefore, with control grid 198 connected to the junction of resistors 206 and 207 and thereby biased by the voltage appearing across resistor 207 and with control grid 208 connected between resistors 204 and 208 and thereby biased by the voltage appearing across resistors 204 and 209, negative biasing voltages are applied to both input terminals. As a result thereof and in the absence of a positive overriding signal from either the time base 23 or pulse generator 24, the gating circuit 170 is effectively blocked and no signal is produced on output lead 203.

In operation, the pulse repetition rate developed by frequency generator 24 is dependent upon the analogue input signal, which may be a voltage having a magnitude ranging from zero to fifty volts. Assuming that the current in tube 171 of generator 24 drops, the potential appearing at plate 173 will rise, and this rising potential is coupled to grid 177 of tube 172 through capacitor 181. As the voltage applied to grid 177 rises, the current flowing in tube 172 will also rise and cause the potential at anode 176 to drop. This negative going potential at anode 176 is cross-coupled through capacitor 182 to grid 174 and conduction in tube 171 is thereby further decreased. The regenerative process continues until grid 174 of tube 171 is driven below cut off and the grid of tube 172 is driven sufficiently positive to cause tube 172 to conduct at saturation. When this condition is reached, capacitor 182 begins to discharge through resistor 188 and the voltage on grid 174 begins to rise toward the cutoff level of tube 171. When the voltage on grid 174 reaches the cutoff level, current flow will be initiated in tube 171 and the voltage appearing at anode 173 will obviously drop. This decrease in voltage is cross-coupled via capacitor 181 to control grid 177 whereupon current flow in tube 172 is reduced the voltage at anode 176 is increased, and this voltage increase is coupled by capacitor 182 back to control grid 174 to further increase the current flow in tube 171. As described hereinbefore, this regenerative action continues until tube 171 is conducting at saturation and tube 172 is cut off. The time required for the potential of grid 174 to rise sufficiently to drive tube 171 into conduction depends upon the initial bias of grid 174 which in turn determines the initial charge developed across capacitor 182. For example, if the analogue input potential is +50 volts and the voltage supply is +250 volts, a 200 volt potential is applied across capacitor 182 during the time that tube 172 is cut off. On the other hand, when the analogue input is zero volts, the potential applied across capacitor 182 is 250 volts. One-half cycle later when tube 172 is again caused to conduct and the potential appearing at plate 176 is caused to drop, the potential at the grid 174 drops correspondingly. When the potential across capacitor 182 is 250 volts, which occurs when the analogue voltage is zero, grid 174 of tube 172 is driven 50 volts further below the cut off level than when the potential across capacitor 182 is only 200 volts. Consequently, it takes a correspondingly longer time for grid 174 to rise to the level at which conduction begins and the regenerative action reverses the conditions of conduction of tubes 171 and 172. As illustrated, the output of generator 24 is taken from anode 176 and comprises a train of square wave pulses, and from the foregoing description it becomes apparent that the oscillation frequency of generator 24 is the highest when the analogue input is maximum and the charge developed across coupling capacitors 182 and 181 is a minimum.

The train of square wave pulses, having a frequency proportional to the magnitude of the analogue input signal, are differentiated by a network including capacitor 192 and resistor 207 and the resulting voltage spikes are applied to control grid 198 of gating circuit 170. As described before, in order to produce an output on the output lead 203, gating circuit 170 requires, in addition to the pulse on grid 198, a triggering pulse on grid 200. Accordingly, a positive triggering pulse is applied to grid 200 from time base 23 over lead 205. This timing pulse, in effect, opens the gate 170 and allows the positive spikes applied to control grid 198 to be transferred to output lead 203 as negative pulses. The positive spikes applied to grid 198 are equal in number to the number of cycles produced by generator 24, and since the pulse produced by time base 23, which turns the gate "on," is of a fixed and constant duration the number of negative pulses appearing on output lead 203 is a measure of the generator frequency, which in turn is directly related to the magnitude of the analogue input signal. As shown, output lead 203 is connected to the units counter 28, which serves to count the output pulses appearing on lead 203.

The time base unit 23 may be of conventional design, such as a crystal controlled oscillator and a shaper circuit followed by cascaded multivibrator dividers in order to derive a source of lower frequencies. The time base 23 is actuated by the positive analogue potential applied to the conversion unit 11 over the lead 18 and, in turn, triggers "on" the frequency generator 24. As stated hereinbefore, the pulsed voltage output of the multivibrator 24, which is directly proportional to the analogue signal, is applied to the units counter 28. Upon completion of the previous display interval of the particular channel, the counter unit 28 was reset to zero by forcing all binaries in the counter units 26, 27, and 28 into a particular state by the application of a large positive pulse over a lead 31. Hence, at the time $T=0$, the units counter 28 commences the measurement of the pulse rate developed by the generator 24. Each of counter units 26, 27, and 28 are similar and may be commercially available units, such as Model 700A Decimal Counting Units, manufactured by the Berkeley Scientific Co. In each unit, such as the units counter 28, four trigger circuits, each with two stable states, are connected in cascade to form a scale of 16 which is permuted to a scale of 10 by two R–C feedback networks. One feedback path feeds the output of the third stage back to the second stage and the other feeds back the output of the fourth stage back to the third stage. The input is applied to the first stage and the unit operates as a conventional binary counter up to the count of four. On the count of four the third stage is triggered, sending a pulse through the first feedback network, thereby triggering the second stage. This is equivalent to adding two input pulses and the unit now corresponds to a binary count of six. On the actual count of six the fourth stage is triggered, sending a pulse through the second feedback network which triggers the third stage. This is equivalent to four additional pulses being applied and the unit now has a count of 12 stored therein. The unit then operates as a binary scaler for the remaining four pulses required to reset it to zero. Therefore, by adding the equivalent of six input pulses, the scale of 16 has been permuted to a scale of 10. The pulses developed by the generator 24 are applied to the input of the units counter 28 and upon the application of 10 pulses therefrom the units counter overflows and applies a pulse to the 10's counter 27. After 10 pulses are applied to the 10's counter 27, a carry-over pulse is applied to the input of the 100's counter 26, thus, it becomes apparent that the pulses developed by the multivibrator 24 during the period established by the time base circuit 23 and accumulated in the counter 28 accurately represent the amplitude of the analogue potential.

A resistor network is incorporated in each of the decimal counter units 26, 27, and 28 and serves to provide a source of voltage whose D.-C. level or amplitude is related in a linear manner to the number stored in the associated counter unit. The voltage which appears across the resistor, as the counter unit is triggered through its complete cycle, has a nine step, staircase voltage waveform whose incremental increase is a constant value. The resistor network includes five resistors; one connected between a common terminal point of all resistors and to the anode of each of the four stages which is normally conducting when the counter unit is reset to zero. The fifth resistor is connected between the common terminal and ground and across which the stepping voltage appears. The currents flowing through the common fifth resistor are in the ratio of 1:2:2:4 for the stages 1 to 4.

It has been found that the starting voltage for zero count may be 30 volts and the size of the voltage step approximately 4.5 volts, which provide satisfactory gating of the output and proper functioning of the particular digital display unit to be described hereinafter.

Thus, during the period from $T=0$ to $T=8$ as illustrated in Fig. 2, the analogue potential applied to the input terminal 15 of channel A has been stored in accurate digital form in the conversion unit 11. During this same period the data stored in the conversion unit 11b of channel B was being read-out to the display unit 14. At the time $T=8$, as shown in Fig. 2–S, a negative pulse is applied to the gate 16 which effectuates its closure, and a positive pulse is applied to the gate 16b, as shown in Fig. 2–A, which effectively commences the conversion period for the potential applied to channel B.

The linear counter 12, and associated circuits supply the gating and timing signals for the circuits of channel A. The counter 12 is physically and functionally similar to the linear counter disclosed in my copending application, Serial No. 340,245, filed March 4, 1953, now Patent No. 2,850,723, issued Sept. 2, 1958, and assigned to the same assignee, and includes five bistable multivibrator stages, 32, 33, 34, 35, and 36. A gating circuit 37 is interposed between stage 32 of the linear counter and a timing circuit 38 which provides the time base for all circuits and whose waveform is shown in the timing diagram of Fig. 2–J. Timing circuit 38 may be a conventional, symmetrical, free-running multivibrator having a frequency which may be adjusted such that analogue voltage sampling and digit display rates may be varied. Symmetrical, free-running multivibrator circuits are well known and readily understood by those skilled in the art, one reference to which may be found in Radiation Laboratory Series, volume 19, page 173. The gating circuit 37 is under the control of a flip-flop circuit 39, which generates alternately positive and negative voltages on an output terminal 40 in response to impulses developed by the counter stages 36 and 36b of the linear counters 12 and 12b which are applied to a lead 41 which interconnects the circuits 36 and 36b and the flip-flop 39. The voltage impulses developed by the circuits 36 and 36b, appear in Fig. 2–P and 2–C, respectively. The voltages developed by flip-flop 39, and applied along leads 40 and 40b, appear in Figure 2–H and 2–K, respectively. After the completion of each display cycle the flip-flop 39 receives a pulse over the lead 41 from either stage 36 or 36b, either of which serve to reverse its conductive conditions as shown in Fig. 2–I, and thereby reverses the polarity of the voltages appearing on the leads 40 and 40b. A positive potential appears on the lead 40 and a corresponding negative potential, as shown in Fig. 2–K, appears on the lead 40b upon completion of the display cycle of channel B thereby opening the gate 37 and closing the gate 37b. As noted in Fig. 1, the timing circuit 38 is coupled to the gates 37 and 37b and as shown in Fig. 2–J at $T=8$ the output of the timing circuit 38 goes negative and is applied through the open gate 37 to the counter stage 32. This negative pulse causes a reversal of conditions in the counter 32 and a positive impulse, as shown in Fig. 2–L, appears in the output and is applied to the gating circuit 16b of channel B. A negative pulse is simultaneously developed by the circuit 32 and is applied over a lead 42 to the counter stage 33 which reverses its conductive conditions and a positive pulse appears on terminal 43, as shown in Fig. 2–M. This pulse is applied to the gating circuit 22, the succeeding counter stage 34, and to a gating circuit 46 over a lead 47. Gating circuit 22 couples a selection potential over a lead 48 to the digital display unit 14, to be described hereinafter, which serves to select either a plus or a minus sign, depending upon the polarity of the potential applied to the input terminal 15 of channel A. The gating circuit 46 serves to couple a fixed potential (not shown) which is applied to a lead 49 to the digital display unit for placement of the polarity sign at the proper position on the screen of the display device.

When the timing circuit 38 subsequently goes positive, the positive impulse is applied over a lead 50 to a pulse generator 51 of the digital display unit and the resulting signal, the waveform of which is shown in Fig. 2–R, is applied by a lead 52 to the grid of the charactron tube. Pulse generator 51 may be a conventional, monostable multivibrator circuit which, upon receipt of a trigger pulse from timing circuit 38, produces a single positive output pulse. The theory and operation of multivibrator circuits, such as generator 51, are well known, and a description may be found in Radiation Laboratory Series, volume 19, page 166. Thus, the tube will be turned on and the electron beam will be shaped in cross-section corresponding to the polarity sign as dictated by the signal appearing on the lead 48 and applied to a vertical selection amplifier 54. The signal applied to the vertical selection amplifier 54 is also applied to a vertical deflection amplifier 53 and the polarity sign will appear at a position on the fluorescent screen dictated by the voltage applied through the gating circuit 46 to a deflection amplifier 55 and the voltage applied to the amplifier 54. When the output potential of the timing circuit 38 again goes negative, the counter stage 33 is restored to its "off" condition and counter circuit 34 is turned "on." Gates 56 and 57 are actuated by the positive impulse, shown in Fig. 2–N, and appearing on lead 58 and which is applied to the gating circuit 57 by a lead 59. With the gating circuit 56 actuated, the voltage which accurately represents the count stored in the 100's counter circuit 26 is applied over a lead 62 to a horizontal deflection amplifier 63 and also to a horizontal selection amplifier 64, both of which are associated with the digital display unit 14. The gating pulse applied to the gating circuit 57 over the leads 58 and 59 serves to couple the deflection amplifier 55 to a voltage applied to a lead 65. The voltage read-out of the 100's counter 26 and applied to the horizontal selection amplifier 64 serves to select the 100's digit, whereas, the voltage applied to the deflection amplifier 55 via the gating circuit 57 serves to position and space the 100's digit adjacent to the polarity sign when the timing circuit 38 again goes positive and causes the display device to be turned "on." A third cycle of the circuit 38, whereupon a negative pulse is generated, produces a positive impulse, as shown in Fig. 2–O, from the counter stage 35 which appears on an output terminal 66 and is applied to the gating circuits 67 and by a lead 70 to the circuit 68. With the gate 67 opened, the voltage which represents the count stored in the 10's counter circuit 27 is read-out over a lead 69 to the horizontal selection amplifier 64 and serves to select the 10's digit representing the value thereof of the analogue potential. By opening the gating circuit 68, a voltage (not shown) which is applied to a terminal 73 is transferred to the deflection amplifier 55 which serves to position and space the 10's digit beside the 100's digit when the cathode ray tube is again turned "on" by the action of the timing circuit 38 and the pulse generator 51.

The next negative cycle of the timing circuit restores counter 35 and reverses the state of counter 36. A positive voltage is produced on lead 74, which is shown in Fig. 2–P, and is applied to a pair of gating circuits 75 and 76, thereby causing the voltage representing the units count stored in counter 28 to be transferred to the selection amplifier 64 and deflection amplifier 63. A fixed voltage applied to one terminal 77 of the gate 76 is therewith applied to the deflection amplifier 55. The succeeding negative cycle of the timing circuit 38 causes the output terminal 74 of counter stage 36 to be driven negative which turns "off" the gates 75 and 76, and by coupling the negative pulse shown in Figure 2–Q both to the flip-flop 39 and to the counter stage 32 via the lead 41, the flip-flop 39 is reversed and the negative voltage appearing on the lead 40 closes the gate 37 and the linear counter 12 is reset to zero. The gating circuit 16 is actuated by a positive pulse applied from the linear counter circuit 12b and the decimal counter unit 25 is cleared by the pulse applied thereto by the lead 31 and the analogue potential applied to input terminal 15 is once again ready to be sampled.

In a manner similar to that of counter circuit 12 described hereinbefore, counter circuit 12b serves to successively open gates 22b, 56b, 67b, 75b, and 76b to control the storage and read-out functions of channel B circuits. The potential shown in Figure 2-G is produced by counter 32b and serves to open gate 16 of channel A and during the display of data stored in channel B this potential remains positive. A negative pulse is simultaneously developed by the circuit 32b and is applied to counter stage 33b which reverses its conductive conditions and produces the positive pulse shown in Figure 2-F. This pulse is applied to gate circuit 22b, counter stage 34b, and to gate 46b; and when counter 33b is restored to its "off" condition counter circuit 34b is turned "on" thereby producing the positive potential shown in Fig. 2-E. Similarly, when counter 34b is restored to its "off" condition, counter 35b is turned "on" and the positive pulse shown in Figure 2-D is produced. When counter 35b is restored to its "off" condition, counter 36b is turned "on" and the positive pulse shown in Figure 2-C is produced. Subsequently, when counter 36b is turned "off," a negative going pulse, as shown in Figure 2-B, is produced and is applied along lead 41 to reset flip-flop 39.

Figure 3:
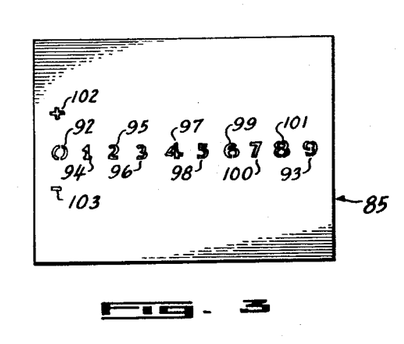
Figure 3 illustrates the numeral shaping matrix of the cathode ray tube and a suitable arrangement for the numerals and signs.
Figure 7:
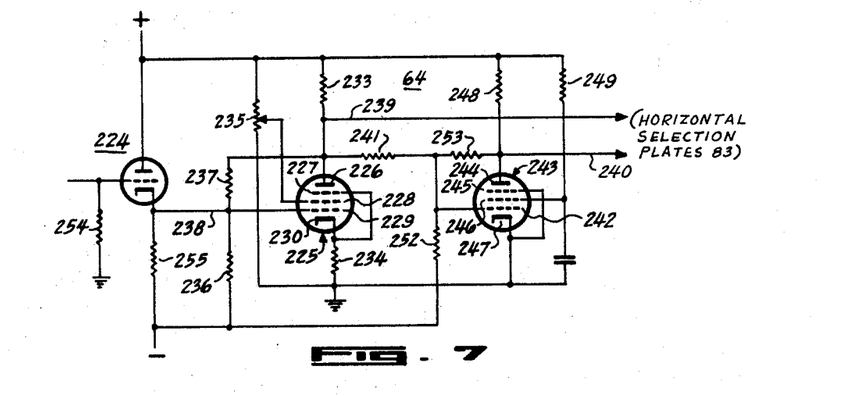
Figure 7 is a schematic diagram of the horizontal selection amplifier 64.

The display unit 14, shown within the dotted rectangle, comprises a cathode ray tube 80, the selection amplifiers 54 and 64, the deflection amplifiers 53, 55, and 63, and the pulse generator 51. The cathode ray tube shown in Fig. 1 includes an electron gun 81, a grid 82, a pair of horizontal selection plates 83, a pair of vertical selection plates 84, a beam shaping matrix 85, a pair of horizontal deflection plates 86, a pair of vertical deflection plates 87, and a fluorescent screen 88. The amplifiers 53, 54, 55, 63 and 64 are all similar in that they are resistance coupled amplifiers of well-known design which incorporate sufficient feedback for stability and serve to amplify the D.-C. signals applied thereto by the gating circuits denoted by numeral 13. The horizontal amplifier 64 develops the potentials, which, when applied to the horizontal selection plates 83 of the cathode ray tube 80, provides selection of the digit openings zero through nine in the matrix 85 through which the electron beam passes. A detail illustration of a beam shaping matrix suitable for use in the present invention is shown in Fig. 3. The horizontal selection amplifier 64, together with an associated input circuit 224, is schematically illustrated in Fig. 7, and includes a direct coupled amplifier circuit, which provides the selection signal for one of the horizontal selection plates 83, and also includes a 1:1 inversion circuit directly coupled to the output of the amplifier circuit, which provides an inverted selection signal to the other horizontal selection plate. The amplifier circuit of amplifier 64 includes an electron tube 225 having an anode 226, a suppressor grid 227, a screen grid 228, a control grid 229, and a cathode 230. Suitable operating voltages are supplied the tube 225 from a source of voltage (not shown), which is connected to anode 226 through a load resistor 233, and the plate circuit of the amplifier is completed by connecting cathode 230 to ground through a resistor 234. A potentiometer 235 may be connected across the voltage source to supply via the variable tap a suitable operating voltage to screen grid 228. To provide the proper operating characteristics, control electrode 229 is interconnected to a source of negative voltage (not shown) by a grid return resistor 236 and is also connected to the anode 226 of tube 225 through feedback resistor 237. The input signal applied to the direct coupled amplifier is delivered from the input cathode follower circuit 224, to be described hereinafter, over input terminal 238 to amplifier 64 and the amplified output signal developed therein appears across load resistor 233 on output conductor 239. As shown, the signal generated by the amplifier circuit is applied to the 1:1 inversion circuit by interconnecting the anode 226 of tube 225 through a resistor 241 to control electrode 242 of an electron tube 243. Tube 243 includes in addition to electrode 242, an anode 244, a suppressor grid 245, a screen grid 246, and a cathode 247. Suitable operating voltages are afforded the tube by connecting anode 244 and screen grid 246 to the voltage source through resistors 248 and 249, respectively. As in the case of the amplifier circuit, control electrode 242 is connected to a source of negative voltage through a grid return resistor 252 and is also connected to the anode 244 of tube 243 through feedback resistor 253. The inversion circuit is preferably connected to provide unity again and hence, serves to invert the signal developed by the preceding amplifier circuit. Thus, the signal produced by the amplifier and applied over conductor 239 in conjunction with this inverted signal developed by the inversion circuit and applied over conductor 240 provide a push-pull force on the electron beam when applied to the horizontal selection plates 83.

Selection amplifier 64 also includes the input circuit 224, which serves to provide suitable isolation and proper impedance adjustment between the conversion unit 11 and amplifier tube 225 of selection amplifier 64. As shown in Fig. 7, circuit 224 may be connected as a conventional cathode follower circuit with the input signals developed by the aforementioned resistor networks associated with unit 11 being impressed across a grid return resistor 254 through gating circuits 56, 67, and 75. The output signal produced by circuit 224 appears across a cathode load resistor 255 and is coupled to control electrode 229 of electron tube 225 via the lead 238. The input voltage applied to the amplifier 64 is obtained, as mentioned hereinbefore, from the conversion unit 11 and the output of the amplifier is adjusted to suit the deflection sensitivity of the cathode ray tube 80. When the count in the digital counter unit 25 is zero and is read-out to the amplifier 64, the voltage impressed across the horizontal selection plates 83 will direct the electron beam to the zero shaped opening 92 in the matrix 85, as illustrated in Fig. 3. The gain of the amplifier 64 is also adjusted so that when the count of nine is stored in the digital counter unit 25, the voltage impressed upon the selection plates 83 will cause the electron beam to pass through the nine shaped opening 93 in Fig. 3. With the linearity of the amplifier 64 and the electrostatic field between the plates 83 through which the electron beam must pass established, the shaped openings 94-101 may also be selected in accordance with the count registered in the counter unit 25. The vertical selection amplifier 54 is similar to the horizontal selection amplifier 64, however, linearity is not a requirement. Only three different conditions are selected by the amplifier 54, that is, a positive sign 102, a negative sign 103, or the digits 94-101, and the amplifier 54 is clamped in one of three states. A positive-going signal from the polarity unit 10 causes the amplifier plate potential to drop. The vertical selection plate 84 of the cathode ray tube connected to this point also changes potential, and, in so doing, the electron beam moves upward to select the + sign. When the required voltage is attained, a diode conducts and clamps the output to this voltage. A negative-going input signal from the polarity sensing unit 10 has the reverse effect on the output, and the electron beam will move downward to be deflected through the — sign in the matrix 85. At the proper voltage a clamping action is exerted and the beam is held in this position regardless of further increase of the negative input voltage.

Figure 8:
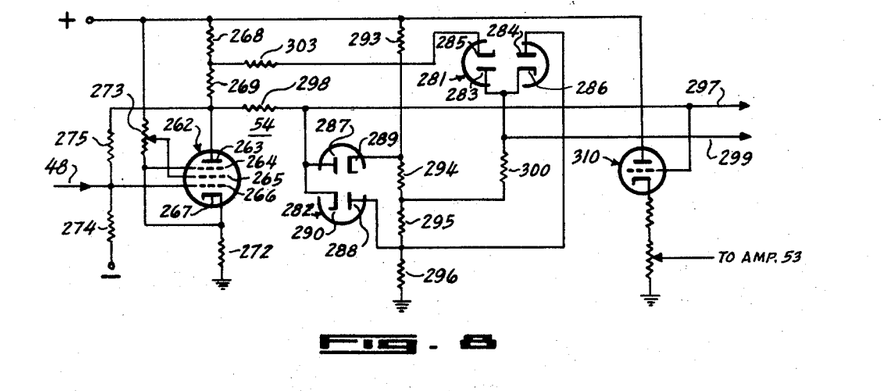
Figure 8 is a schematic diagram of the vertical selection amplifier 54.

The vertical selection amplifier 54 is schematically illustrated in Fig. 8 and includes an electron tube 262 having an anode 263, suppressor grid 264, screen grid 265, control grid 266, and a cathode 267. Suitable operating voltage is supplied to tube 262 from a source of voltage (not shown) which is connected to anode 263 through a pair of load resistors 268 and 269, and the plate circuit of the amplifier is completed by connecting cathode 267 to ground through a resistor 272. A potentiometer 273 may be connected across the voltage source to supply via the variable tap a suitable operating voltage to screen grid 265. To provide the proper operating characteristics, control electrode 266 is interconnected to a source of negative voltage (not shown) by a grid return resistor 274. Feedback is incorporated in the vertical selection amplifier 54 by interconnecting control electrode 266 and an anode 263 through a feedback resistor 275. The input signal applied to the control grid 266 of amplifier 54 is transmitted from gating circuit 22 over lead 48 and pairs of output potentials are developed by the amplifier across load resistor 268 and 269, which when applied to the vertical selection plates 84 serve to direct the electron beam either through the positive sign 102, the negative sign 103, or the digit openings 94 to 101 of matrix 85. A pair of dual diode tubes 281 and 282 are associated with the output potentials and serve as clamping circuits to establish the output potentials at predetermined levels to assure proper orientation of the beam upon matrix 85. Diode 281 comprises a pair of anodes 283 and 284 and a pair of cathodes 285 and 286; diode 282 similarly comprises a pair of anodes assigned reference numerals 287 and 288 and a pair of cathodes 289 and 290. A source of bias voltage is supplied clamping tubes 281 and 282 by placing serially connected resistors 293, 294, 295, and 296 across the positive voltage source (not shown). Anode 287 and cathode 290 of diode 282 are interconnected and together are connected both to output terminal 297 and to anode 263 of electron tube 262 through a resistor 298. Anode 288 is connected to a positive voltage point on the voltage divider network between resistors 295 and 296 and thereby establishes the lower voltage limit to which output terminal 297 may be driven by tube 262. Cathode 189 of diode 282 is connected to the junction between resistors 293 and 294 and thereby establishes the highest voltage to which the output terminal 297 may rise. Thus, it becomes apparent that diode 282, connected in this manner, serves to clamp the upper and lower voltage limits of terminal 297, and since terminal 297 is connected to the lower plate of vertical selection plates 84 the voltage appearing on this plate is clamped. Anode 283 and cathode 286 of diode 281 are both directly connected to an output terminal 299, which is coupled across resistors 295 and 296 of the voltage divided through resistor 300. Cathode 285 of diode 281 is coupled through a dropping resistor 303 to the junction of load resistors 268 and 269 and anode 284 is connected across resistor 296 of biasing network. Thus, with diode 281 connected in this manner, it becomes apparent that the upper voltage limit of output terminal 299 is clamped at the voltage which is established across resistor 295 and 296 of the biasing voltage divided network, whereas the lower voltage limit to which terminal 299 may be driven in that voltage which is established across dropping resistor 296 and which is applied to anode 284. Since output terminal 299 is connected to the upper plate of vertical selection plates 84 the voltages impressed upon this plate are likewise clamped.

In operation, both positive and negative input signals are delivered from sensing unit 10 through gate 22 and over lead 48 to the vertical selection amplifier 54. However, with the vertical selection amplifier connected in the described manner, only positive voltages are developed and applied over leads 297 and 299 to provide selection of either the positive symbol, the negative symbol, or the row of digit shaped openings 94 to 101. When the input signal is positive, lead 299 is clamped at a voltage which is more positive than the voltage appearing on lead 297. On the other hand, when the input signal is of negative polarity, lead 299 is clamped at a voltage which is less positive than the voltage appearing on lead 297. However, when digit selection is desired the positive voltages appearing on leads 297 and 299 are equal in magnitude. When applied to vertical selection plates 84, these equal potentials allow the electron beam to traverse the plates without being deflected. Hence, the beam is aligned with the numeral shaped openings 94 to 101, which as illustrated are centered in the matrix 85. The horizontal deflection amplifiers 55 and 63, which serve to compensate for deflections of the electron beam from the axis of the tube during the selection operation, may be similar to the horizontal selection amplifier 64, which is shown in Fig. 7 and described hereinbefore. However, in regard to amplifiers 55 and 63 but one output is obtained from each, and each is applied to a separate one of plates 86. The input signal applied to amplifier 55 is obtained through gates 46, 57, 68, and 76 sequentially, and serves to produce predetermined potentials as described hereinbefore. The summation of the gated potentials by amplifier 55 and the amplification therein serves to produce an output potential having a generally staircase waveform that progressively changes as the gates are operated. When the output of amplifier 55 is applied to deflection plate 86, the electron beam is correspondingly deflected to orient the digit displays in proper sequential order upon the surface 88 of the display tube 80. The input to amplifier 63 is obtained from counter unit 25 through gates 56, 67, and 75 whereby output potentials representative of the count stored in counter unit 25 are transferred to the amplifier. These input potentials are combined and amplified by amplifier 63 and an output signal is produced which is applied to a horizontal deflection plate 86. Thus, beam deflections are produced which compensate for the horizontal deflections applied to the beam during the digit selection operation. The digit displays are thus positioned in proper progression across the display surface 88 regardless of the deflections induced to selectively shape the beam.

The vertical deflection amplifier 53 may also be similar to the horizontal deflection amplifier 64 shown in Fig. 7. Amplifier 53 is supplied with input potentials from three sources; one of which is from the cathode follower 310 of vertical selection amplifier 54 shown in Fig. 8 and the other two sources are from gates 22 and 22b which alternately supply potentials representative of the analogue input data being supplied. The output of amplifier 53 is applied to vertical deflection plates 87 and the induced beam deflections are such as to compensate for the vertical deflection of the beam produced by selection amplifier 54. Hence, the displayed polarity signs are thus properly positioned in the single row raster formation.

A cathode follower is also included in the vertical selection amplifier 54 whose grid is connected to that selection plate 84. The purpose of this cathode follower is to provide a voltage for the vertical deflection amplifier 53 related to the positions of the + and − signs in the matrix 85. By the proper selection of the cathode load resistor, the vertical selection amplifier 54 will provide two voltages which figuratively place the two signs in juxtaposition prior to final placement on the screen. There is no provision in the vertical selection amplifier 54 to properly position the digits vertically. That is, the cathode follower cannot differentiate digit placement from positive sign placement. Hence, in the display the sign would be displaced upward from the numbers to which it is related, if no correction were made.

The horizontal and vertical deflection amplifiers 55 and 53, are connected to the deflection plates 86 and 87, respectively, of the cathode ray tube and in conjunction with the amplifier 63 provide the voltages for positioning the polarity signs and digits upon the fluorescent screen 88. The voltage developed by the deflection amplifier 63 is derived from across the resistor matrix in each of the counter units of counter 25, and, therefore, is related to the count stored in the decimal counter unit 25 and consequently, the digit opening through which the electron beam passes in the matrix 85. The voltage developed by the deflection amplifier 55 is derived from the gating circuits 57, 68, and 76 and is applied in opposition to voltages developed by the deflection amplifier 63. The voltages applied to the deflection plates 86 are opposed in sense; the voltage appearing at the output of the amplifier 63 is a positive voltage with a positive progression step in order of the number, and the potentials appearing at the output of the amplifier 55 are inverted and made negative and progress more negatively in the order of position. Hence, as a particular channel is being read-out into the display unit 14, a polarity sign and three numbers accurately representing the analogue input potential being applied to an input terminal, such as terminal 15, will appear approximately centered on the fluorescent screen 88 of the cathode ray tube 80. Where two or more analogue input channels are being utilized, a bias voltage developed by each channel is applied to the horizontal deflection amplifier 55 which serves to displace the digital displays to predetermined identifiable positions on the fluorescent screen 88. As shown in Fig. 4, the digital display of two channels, such as channel A and channel B, are illustrated on the screen 88. With the digital amplitude of the analogue potential applied to channel A exemplified as −059 and the digital amplitude of the analogue potential applied to channel B, exemplified as +382, variations of the analogue quantities of each channel will appear as corresponding variations of the digital magnitudes. These instantaneous changes in the digital number will remain in the same relative positions and thereby allow rapid monitoring and identification of each channel.

While certain preferred embodiments of the invention have been specifically disclosed, it is understood that the invention is not limited thereto as many variations will be readily apparent to those skilled in the art and the invention is to be given it broadest possible interpretation within the terms of the following claims:

I claim:

1. An electronic analogue-to-digital converter for use with a cathode ray tube having a viewing screen, said tube being responsive to 1st and 2nd input direct current signal magnitudes for displaying plus and minus signs, respectively, on the viewing screen and responsive to 3rd, 4th, 5th, 6th, 7th, 8th, 9th, 10th, 11th, 12th input direct current signal magnitudes for displaying the 0, 1, 2, 3, 4, 5, 6, 7, 8, 9 decimal digits, respectively, on the viewing screen, said converter being adapted to convert the magnitude and polarity of an input analogue signal into the value and sign, respectively, of a corresponding decimal number visually displayed on the screen, said converter comprising: first means responsive to positive and negative polarities of input analogue signals for producing said 1st and 2nd direct current signal magnitudes, constant time controlled means for generating a signal whose frequency is a function of the magnitude of said input analogue signals; decimal counting means including at least first, second and third place stages for counting the cycles in the signal produced by said constant time controlled means during a predetermined interval of time whereby the resulting count represents a function of the magnitude of input analogue signals; first, second, and third conversion means associated with the first, second, and third stages of said decimal counting means, respectively, each of said conversion means being responsive to individual decimal digits 0, 1, 2, 3, 4, 5, 6, 7, 8, and 9 counted in its respective counting means stage for producing the 3rd, 4th, 5th, 6th, 7th, 8th, 9th, 10th, 11th, and 12th direct current magnitudes, respectively; and means for sequentially applying the direct current signals produced by said first means and by said first, second, and third conversion means to the cathode ray tube whereby the sign and three decimal digits representing the polarity and magnitude, respectively of the input analogue signal are displayed on the viewing screen of the tube.

2. An electronic device for alternately and separately producing visual displays of the corresponding decimal digits of first and second decimal numbers whose values correspond to the magnitudes of first and second unidirectional input analogue signals of positive and negative polarity, said device comprising; first and second conversion channels, said channels each having time base signal generating means producing a series of timing signals having substantially the same duration and each having variable frequency generating means controlled by said timing signals and continuously responsive to the magnitudes of said input analogue signals for producing output signals whose frequency is proportional thereto, said channels each having decimal counting means with a plurality of stages, said counting means being responsive for counting from zero the cycles in said output signals during the appearance of each of said timing signals, a plurality of analogue converting means, one for each stage in each of said decimal counting means, each of said converting means serving to convert the value of the count in its respective stage into a corresponding analogue signal magnitude; means for applying said first and second input analogue signals to the variable frequency generating means in each of said first and second conversion channels, respectively; cathode ray tube means responsive to the magnitude of input analogue signals for producing visual decimal digits whose value corresponds thereto; said applying means including first and second polarity sensing means for sensing the polarity of said first and second input analogue signals and for producing separate first and second analogue signals whose magnitudes correspond to said positive or negative polarity of the associated one of said first and second input analogue signals, said cathode ray tube means being responsive to said separate first and second analogue signals for producing separate visual images indicating the polarity of said visual decimal digit, means responsive to first and second input signals for sequentially applying the output analogue signals produced by the polarity of analogue converting means in said first and second conversion channels, respectively, to said cathode ray tube means; and means for applying alternate first and second signals to the last named means whereby the alternate sequentially appearing images on a cathode ray tube means represents the decimal number values of the first and second input analogue signals.

3. An electronic unit capable of translating a unidirectional analogue input voltage of positive or negative polarity into corresponding decimal information, said device including a polarity sensing means for receiving said input analogue voltage and for transforming said input analogue voltage whether of positive or negative potential into a uni-directional analogue voltage having a predetermined polarity, means responsive to said uni-directional analogue voltage for presenting a predetermined timing interval, means responsive to said timing interval and said uni-directional analogue voltage for generating pulses whose repetition rate corresponds to the magniude of said uni-directional analogue voltage, and means responsive to said pulses for counting said pulses and presenting said decimal information.

4. An electronic unit capable of translating a uni-directional analogue input voltage of positive or negative potential into corresponding decimal information, said device including a polarity sensing unit for receiving said input analogue voltage and for transforming said input analogue voltage whether of positive or negative potential into a unidirectional analogue voltage having a predetermined polarity, said polarity sensing unit providing a separate uni-directional output voltage having a magnitude corresponding to whether said input analogue voltage is of positive or negative polarity, a time base means capable of generating a predetermined time interval, a frequency generator means for generating pulses whose repetition rate corresponds to the magnitude of said uni-directional analogue voltage, said uni-directional analogue voltage being simultaneously presented to said time base means and said frequency generating means, said time base means being responsive to said uni-directional analogue voltage to generate said predetermined timing interval, said frequency generator means responding to said timing interval and said uni-directional analogue voltage to generate said pulses during said timing interval, and means responsive to the pulses from said frequency generator means for counting said pulses and presenting said decimal information, said last named means being responsive to said separate uni-directional output voltage for presenting the polarity of said corresponding decimal information.

5. An electronic device for visually displaying a set of characters representing the potential magnitude of a uni-directional analogue input voltage of positive or negative polarity, said device including a polarity sensing means for receiving said input analogue voltage and for transforming said input analogue voltage whether of positive or negative potential into a uni-directional analogue voltage having a predetermined polarity, said polarity sensing unit providing a separate uni-directional output voltage having a magnitude corresponding to whether said input analogue voltage is of positive or negative polarity, unit means responsive to the potential magnitude of said uni-directional analogue voltage for producing a numerical count corresponding thereto, conversion means for converting said numerical count produced by said unit means into the potential magnitudes of a corresponding set of signals, indicating means responsive to said potential magnitudes of said set of signals produced by said conversion means to produce a set of corresponding visual characters, said indicating means being responsive to said separate uni-directional output voltage for indicating the polarity of said set of corresponding visual characters.

References Cited in the file of this patent
UNITED STATES PATENTS

| Number | Name | Date |
|---|---|---|
| 2,275,017 | McNaney | Mar. 3, 1942 |
| 2,277,192 | Wilson | Mar. 24, 1942 |
| 2,394,196 | Morgan | Feb. 5, 1946 |
| 2,404,238 | Loughlin | July 16, 1946 |
| 2,433,340 | Burgess | Dec. 30, 1947 |
| 2,496,912 | Grosdoff | Feb. 7, 1950 |
| 2,568,724 | Earp et al. | Sept. 25, 1951 |
| 2,598,516 | Dickinson | May 27, 1952 |
| 2,603,418 | Ferguson | July 15, 1952 |
| 2,611,811 | Yates | Sept. 23, 1952 |
| 2,616,965 | Hoeppner | Nov. 4, 1952 |
| 2,625,822 | Nichols | Jan. 20, 1953 |
| 2,631,778 | Piper | Mar. 17, 1953 |
| 2,656,106 | Stabler | Oct. 20, 1953 |
| 2,672,284 | Dickinson | Mar. 16, 1954 |
| 2,685,084 | Lippel et al. | July 27, 1954 |
| 2,696,601 | Hilburn | Dec. 7, 1954 |
| 2,700,501 | An Wang | Jan. 25, 1955 |
| 2,717,359 | Wild | Sept. 6, 1955 |
| 2,728,872 | Smith | Dec. 27, 1955 |
| 2,728,906 | Rea | Dec. 27, 1955 |